United States Patent [19]

Billiu

[11] Patent Number: 5,229,052
[45] Date of Patent: Jul. 20, 1993

[54] APPARATUS AND METHOD FOR APPLYING MULTIPLE TYPE FIBERS TO A FORAMINOUS SURFACE

[75] Inventor: Charles R. Billiu, Mt. Clemens, Mich.

[73] Assignee: Wellman Machinery of Michigan, Inc., Warren, Mich.

[21] Appl. No.: 698,950

[22] Filed: May 13, 1991

Related U.S. Application Data

[63] Continuation of Ser. No. 485,434, Feb. 23, 1990, abandoned.

[51] Int. Cl.⁵ .............................. B27N 5/00
[52] U.S. Cl. .................... 264/115; 264/517; 264/121; 264/122; 425/80.1; 425/82.1
[58] Field of Search ........... 264/115, 121, 122, 517, 264/518; 425/80.1, 81.1, 82.1, 83.1

[56] References Cited

U.S. PATENT DOCUMENTS

| | | | |
|---|---|---|---|
| 2,702,261 | 2/1955 | Bacon | 264/115 |
| 3,010,161 | 11/1961 | Duvall | 264/121 |
| 3,328,383 | 6/1967 | Roscher et al. | 264/115 |
| 3,777,231 | 12/1973 | Guschin | 264/121 |
| 3,834,869 | 9/1974 | Ancelle et al. | 264/121 |
| 3,963,392 | 6/1976 | Goyal | 425/82.1 |
| 4,701,294 | 10/1987 | Radwanski et al. | 264/518 |

FOREIGN PATENT DOCUMENTS

| | | | |
|---|---|---|---|
| 566851 | 5/1958 | Belgium | 264/115 |
| 2214005 | 8/1974 | France | 264/115 |

Primary Examiner—Mary Lynn Theisen
Attorney, Agent, or Firm—Reising, Ethington, Barnard, Perry & Milton

[57] ABSTRACT

A method and apparatus for applying fibers to a foraminous mold or surface using strands of binder and glass fibers is disclosed. A strand of binder fiber is chopped and entrained into a chute. The chute has a longitudinal airstream directed therethrough toward the foraminous surface. The binder fiber is separated into filaments by the airstream. The glass fiber strand is chopped and entrained into the chute downstream of the filaments. The chopped glass and the binder filaments mix within the chute and are then directed by the airstream onto the foraminous mold or surface. The mixture may be fanned out from the chute to provide more even coverage of large sized molds or surfaces.

24 Claims, 2 Drawing Sheets

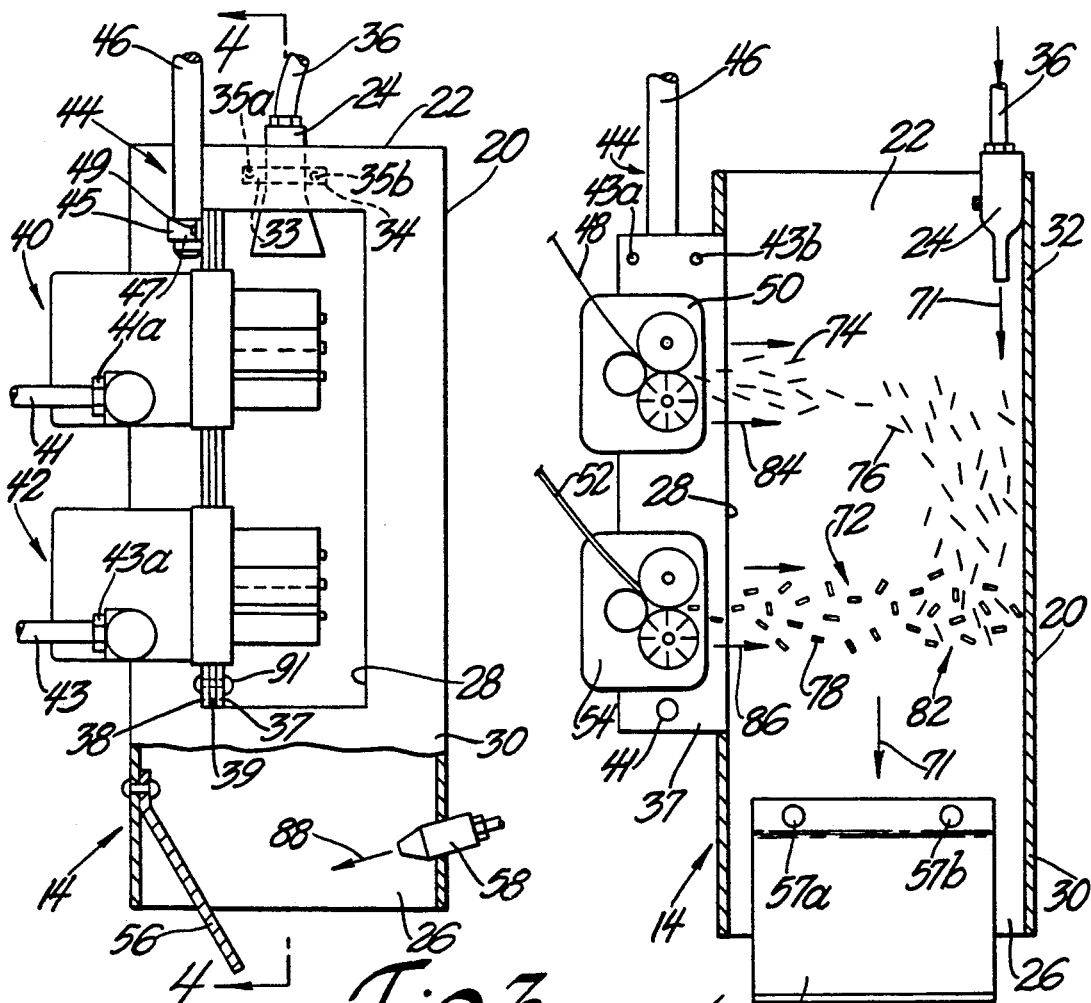

APPARATUS AND METHOD FOR APPLYING MULTIPLE TYPE FIBERS TO A FORAMINOUS SURFACE

BACKGROUND OF THE INVENTION

This application is a continuation of copending application U.S. Ser. No. 485,434 filed Feb. 23, 1990, now abandoned.

The present invention relates generally to the manufacture of directed-fiber composite materials either of preformed or nonformed configurations. A preformed material is formed over a foraminous mold in the shape of the ultimate product to be formed. A nonformed material is deposited over a flat foraminous surface and results in a sheet which can ultimately be molded to a desired shape.

PRIOR ART

Directed-fiber preforms and sheets are a well known intermediate material used in the making of various finished products. These materials are made by forming a substantially open, three dimensional matrices of structural fibers and water based binder either into a shape resembling the finished product or as a sheet for subsequent forming. The structural fibers are commonly glass fibers. These glass fibers are bound together into either preformed or sheet shapes by the binder which is commonly a water borne adhesive material. The material is then additionally processed, by applying heat to drive off the water and set the binder. The intermediate material is then soaked in a resin, and subsequently finish molded into a final product.

One method and apparatus for making directed-fiber preforms using a horizontally translated shuttle is described in applicant's application Ser. No. 07/413,463, filed Sep. 27, 1989, which is herein incorporated by reference.

In a known method of making of directed-fiber preforms illustrated in *Reinforcement Digest* pg. 18, Vol. 46, Jan. 1989; glass fiber roving is chopped to short fiber lengths by an electrically powered chopping apparatus. The glass fiber is then fed through a hopper to a venturi in a tube connected at one end to a high powered fan. A spray head is suspended at the opposite, opened end of the tube for directing a binder liquid. The apparatus directs the glass fibers and binder liquid onto a rotating foraminous mold, or screen, in the shape of the preform to be made. Because the gun is fixed, rotation of the mold is required to cover the mold with fibers. A partial vacuum located behind the mold holds the fibers in place on the mold. The preform is then heated to drive off the water of the binder and activate the binder to set the glass into a matting.

This method results in large amounts of particulate emissions due to "splash-back" from the binder liquid/glass mixture hitting the rotating mold, resulting in material waste, operator health risks, and added labor expense in clean up. Contamination of the environment also results from a binder liquid which commonly contains isocyanates and/or formaldehydes which are released to the atmosphere upon drying and curing the preform.

Further, the preform manufacture process is slowed by the time needed to drive off the water from the binder in the wet preform, and is made more expensive by the heat required to do so.

Also, by using an aqueous binder, such as the commonly used latex slurry, the binder, when heated, will tend to fuse and run in the matrix of the preform. Thus, a webbing or lamination is formed in the matrix which blocks the efficient flow of resins therethrough in the subsequent finishing steps.

U.S. Pat. No. 3,328,383 ('383) illustrates another method and apparatus of applying fibers to a flat foraminous surface to provide the intermediate material in sheet form. The '383 patent discloses a substantially "Dry" method of fiber deposition which forms frangible binder filaments from a resinous binder melt immediately prior to their mixing with the glass fibers. The glass fibers are cut from roving and the binder filaments are shattered when the glass and binder are simultaneously fed through a chopping mechanism from whence they are fed to a chamber having a mold therein. An airstream is directed against the flow of fiber particles to distribute them throughout the chamber. The fibers are then deposited onto the foraminous flat mold or surface.

In such a process many independent variables must be controlled to ensure the correct ratio of binder filament-to-glass fiber. For example, in such a system, diameter of the binder filaments is dependent upon the pressure applied to the resin melting tank, the heat of the melt tank, the diameter of the orifice plate holes which extrude the binder filament, and the pressure and rotation speed of the binder filament take up rollers. Further, the heavier glass fibers and lighter binder filaments may separate upon contact with the opposing airstream, causing an uneven distribution of binder fibers through the preform. The agglomerated binder fibers will then fuse and form globules upon curing, resulting in a weakened preform structure. Also changeover of machine use from one type of binder filament to another is not quickly accomplished in the '383 apparatus.

There is, therefore, need for a composite fiber delivery device which minimizes waste material, reduces environmental contamination, is fast and efficient, and is simple and reliable to use with a variety of different structural fiber and binder filament types. Further, this fiber delivery system should create a fibrous composite comprising an evenly distributed three dimensional matrix of randomly oriented preform fibers in which massing, or agglutination of binder material is minimized. The composite matrix created should further be able to be quickly and efficiently set. The present invention provides a device having the above-cited advantages over the prior art.

SUMMARY OF THE INVENTION

The present invention provides an apparatus for the delivery of fibers to a foraminous mold or surface, comprising:
 (a) a substantially tubular chute having:
  (1) a first end having an opening for receiving an airstream,
  (2) a second end having an opening for discharging a fiber mixture, and
  (3) an opening in the chute for admitting fibers into the chute;
 (b) means for attaching a binder fiber chopper in proximity to the chute;
 (c) means for attaching a structural fiber chopper in proximity to the chute; and (d) an air nozzle for directing an airstream through the chute in a direction from the first chute and to the second chute end Attached to the chute are binder fiber and structural fiber choppers, which serve to chop, or cut, the binder and structural fibers, which are supplied in strands. Once the fibers, i.e., binder and structural fibers, are cut into short lengths, the choppers also entrain the cut fibers into the chute.

The binder fiber chopper is located upstream on the chute. By "upstream" it is meant proximal to the chute first end, which is upstream on the longitudinal airstream supplied by the nozzle. As the cut binder fiber is entrained into the longitudinal airstream the binder fiber is separated into longitudinal binder filaments. These individual binder filaments are carried downstream within the chute by the longitudinal air stream.

The structural fiber chopper is located downstream of the binder fiber chopper. The cut structural fiber lengths are entrained into the longitudinal airstream, which is carrying the binder filaments. Any residual clumps of binder filaments are separated into individual filaments upon collision with the heavier structural fiber lengths, which do not separate out into individual filaments. The mixture of binder filaments and structural fiber lengths is carried by the longitudinal airstream out the second end of the tube. The dispersal pattern of the fibers coming out of the chute may be modified at the chute second end by additional airstreams, or mechanical baffles, or like means, impinging upon the fiber mixture.

The fiber mixture is then deposited upon a foraminous mold or surface in an evenly distributed, three dimensional matrix of randomly oriented mixture of fibers. This matrix is then set by heat. In the matrix, the structural fiber lengths will be bound by numerous individual and separate binder filaments. Because the binder filaments do not agglomerate they will not run or form globules, i.e., agglutinate; in the matrix when heated, which would lead to a weakened intermediate structure and/or subsequent finishing problems, as previously said. Instead, the filaments stay elongated and bound to the structural fibers in a strong interlaced structure.

BRIEF DESCRIPTION OF THE DRAWINGS

FIG. 3 is a front view of an apparatus embodying the present invention.

FIG. 4 is a cross sectional view taken along line IV—IV of FIG. 3 and disclosing operational details of the present invention.

FIGS. 5a and 5b are graphic aids to understanding fiber distribution.

FIGS. 6a–6d illustrates in enlarged detail the various forms taken by the preform fibers as seen in FIG. 4.

DETAILED DESCRIPTION OF THE PREFERRED EMBODIMENT

Figure 1:
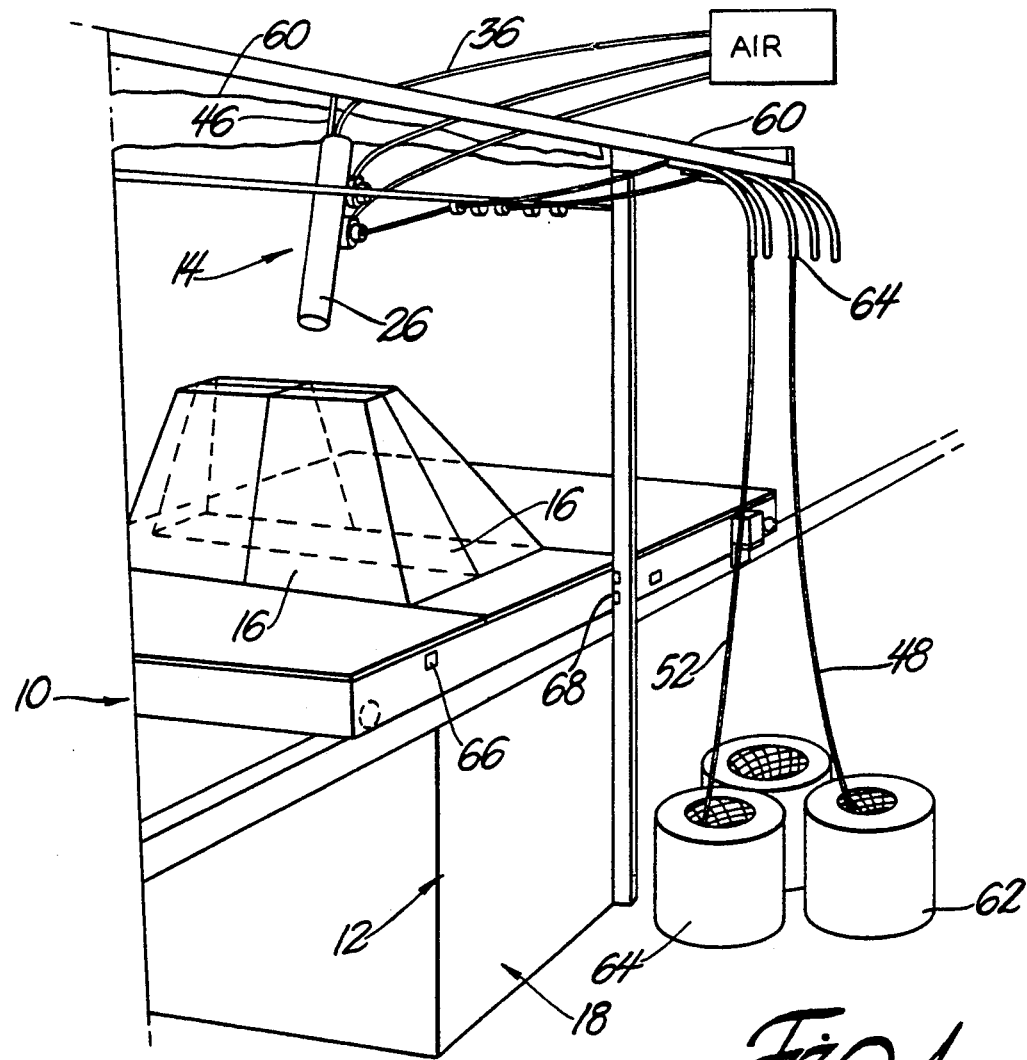
FIG. 1 is an environmental view of an apparatus embodying the present invention.

As hereinafter used "mold" may refer to a contoured shape as shown in the drawings, or a flat surface the latter of which results in a sheet form composite. As seen in FIG. 1 an apparatus 10 comprises a mold control apparatus 12 previously disclosed by the applicant in Ser. No. 07/413,463, now U.S. Pat. No. 5,034,181, and a fiber delivery device 14. The mold control apparatus 12 horizontally translates a foraminous mold 16 over a vacuum source 18 during which the constituent fibers, i.e., the mixture of structural and binder fibers of the preform is deposited on the mold 16.

The activation of the fiber delivery device 14 is controlled by a control unit 70 which controls the shuttle movement so as to activate the fiber delivery device 14 is controlled by a control unit 70 which controls the shuttle movement so as to activate the fiber delivery device 14 when the mold 16 is in the proper position to receive fiber from the delivery device 14.

As seen in FIGS. 3 and 4, the fiber delivery device 14 comprises a substantially tubular chute 20 made of steel or other suitably surface-hard material so as to withstand impingement thereon of glass fiber, or other structural fibers as may be found desirable to use as further explained below.

The chute 20 has a substantially open first end 22 for receiving an airstream from a directed fluid source, such as delivery nozzle 24, as further explained below. The chute has a substantially open second end 26, opposite the first open end 22, through which the fiber mixture 72 exits the chute 20.

A side opening 28 is formed longitudinally in the chute 20 to allow the fibers 72 to be entrained into the interior of the chute 20. The side opening 28 does not run the entire longitudinal length of the chute 20 in the preferred embodiment, but stops short of the chute second end 26 to leave an enclosed cylindrical portion 30 of the chute 20 proximal to the chute second end 26 to provide a choke or other directing means on the dispersal of the filaments/fibers as further explained below.

The airstream delivery nozzle 24 is preferably attached to a wall of the chute 20 proximal to the chute first end 22. The nozzle 24 is positioned to provide a longitudinal airstream 71 through the chute 20 from first chute end 22 to second chute end 26. As shown, the nozzle 24 is affixed within the interior of the chute 20 to a chute wall 32 opposite the side opening 28 by means of a clamp 34 comprising a metal strap 33 fitted over the nozzle 24 and held by pop rivets 35a, 35b. Alternatively, the nozzle 24 may be affixed by adhesives, welding, etc. within or without the chute 20 so long as the proper airstream is achieved as further explained below. The nozzle 24 receives pressurized air from an air line 36 attached to the nozzle 24, in a known manner, and conveys the pressurized air from a compressor (not shown) or the like.

A rectangular mounting plate 38, providing means for attaching first and second fiber choppers 40, 42 respectively, is affixed to the chute 20 by retaining a chute side flange 39 at one longitudinal side of the side opening 28, and positioning the side flange 39 between the mounting plate 38 and an opposing plate 37. The plates 37, 38 are attached to the side flange by an appropriate fasteners, such as by a rivet 91, screw, bolt, or the like. The mounting plate 38 carries thereon the first and second fiber chopper/entraining means 40, 42 respectively as further explained below. The mounting plate 38 also has formed therein throughholes 43a and 43b for receiving therein means 44 for suspending the chute 20 above the preform mold 16 such as a suspender rod 46. A suspender rod 46, as shown, may be affixed at one end to the mounting plate 38 by a clamp 45 comprising a metal strap 47 surrounding the rod 46 and affixed to the mounting plate 38 by screws 49 held in the throughholes 43a, 43b. Alternatively, the rod may be attached to the chute 20 by other means such as a threaded receptacle (not shown) pivotally affixed to the mounting plate 38 and receiving a threaded end (not shown) of the rod 46 therein. The rod 46 is attached, at the other end thereof, to the overhead support rack 60 by suitable means as known in the art. Provision is preferably made for suitable adjustability of the chute position in any such suspension arrangement.

The first and second fiber chopper/entraining means 40, 42 respectfully, are commercially available fiber strand choppers such as Model B-410 Choppers from Glass-Craft, Inc. of Indianapolis, Ind. The fiber choppers 40, 42 are air-powered devices which chop, or cut, fiber strands 48, 52 into short lengths 74, 78 and blow these short lengths of fiber away from the chopper with a directed airstream 84, 86. Such choppers as are utilized with the present invention will preferably have separate motor speed and blower controls, as well as adjustable cutting lengths.

Separate choppers are needed for each fiber-type to adequately maintain consistent cutting results on the various types of fibers as may be used with the preform apparatus 10. Additional choppers may be supplied as needed for different fiber types or increased capacity.

The first fiber chopper/entraining means 40 is attached by conventional means, such as, through bolts (not shown) to the mounting plate 38 proximal to the chute first end 22 so as to be located upstream of the second fiber chopper 42 on a longitudinal airstream 71 supplied by the nozzle 24. A fibrous binder material strand 48, or strands, enter that side 50 of the first fiber chopper 40 distal to the chute 20 during operation of the manufacturing apparatus 10. The first chopper 40 is powered by directed air through an airline 41 attached to first chopper 40 at a nipple 41a. While other thermoplastic materials may be used, the binder material strand 48 currently used is a low molecular weight variety of KODEL (Trademark) polyester type fiber manufactured by Eastman Chemical Products, Inc. of Kingsport, Tenn. and Wellman, Inc. of Johnsonville, S.C. The binder fiber strand currently used is supplied in the form of tow; i.e., a strand without definite twist collected in loose, rope-like form. It is envisioned that a variety of binder fiber strands may be suitably employed by those skilled in the art dependent upon the binder characteristics desired and the chopper/entraining means available to the artisan.

The second fiber chopper/entraining means 42 is attached to the mounting plate 38 by conventional means such as throughbolts (not shown) downstream of the first chopper 40. Glass fiber roving 52 of a known type enters that side 54 of the second fiber chopper 42 distal to the chute 20 during operation of the preform manufacture apparatus 10. The second chopper is powered by directed air through an airline 43 attached to the second chopper at a nipple 43a.

A mechanical baffle 56, or baffles, may be attached by known means such has pop rivets 57a, 57b or the like, onto or proximal to the chute 20 longitudinally downstream of the second chopper 42 to vary the fan, or dispersal pattern, of the fiber mixture 72 exiting the chute second end 26. Alternatively or cooperatively with baffle 56, an oblique airstream 88 may be supplied through a second nozzle 58 to alter the dispersal pattern of the exiting fiber mixture 72. The second nozzle 58 is preferably located longitudinally downstream of the second chopper 42 and will direct the airstream 88 obliquely downstream of the longitudinal axis of the chute 20. Alternatively, the enclosed cylindrical portion 30 of the chute 20 may be formed to provide dispersal, or fanning, means.

Figure 2:
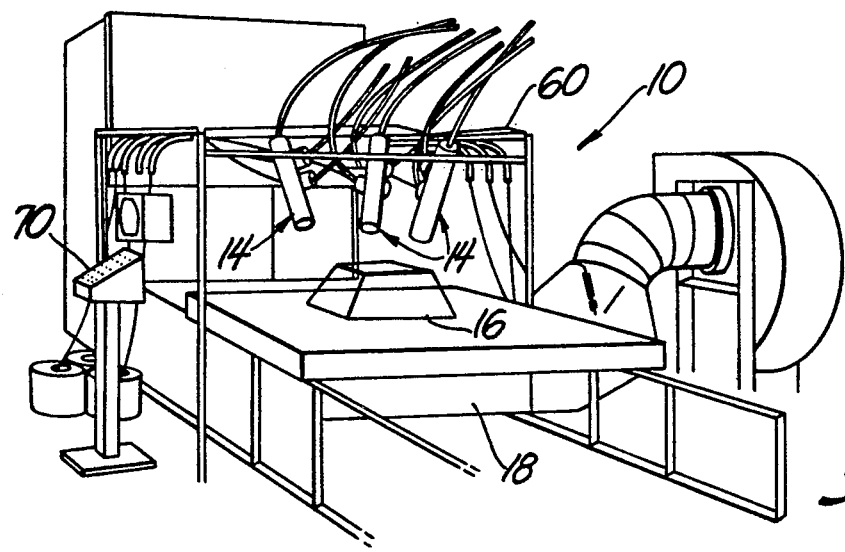
FIG. 2 is a second environmental view.

In use, as seen in FIGS. 1 and 2, the fiber delivery device 14 is suspended by rod 46 from a support rack 60, or otherwise suitably affixed thereto. The delivery system 14 is placed such that the chute second end 26 is pointed toward the foraminous mold 16 when the mold 16 is in a position to have fibers 72 applied thereto.

A fibrous binder strand 48, is fed from its spool 62 through a strand guide 64 attached to the support rack 60. From there, the binder strand 48 is fed to the first chopper 40 which takes up the binder strand 48 as needed during operations. A strand of glass fiber roving 52 is likewise fed from its spool 64 into the second chopper 42. It will be appreciated that each chopper 40, 42 may handle a plurality of strands of fiber. Apparatus 10 is activated so as to translate the mold 16 in the horizontal plane beneath the fiber delivery system 14.

In the preferred embodiment, the fiber delivery system 14 is activated by a position indicator 66 read by a sensor unit 68 which, in turn, communicates with a control unit 70 for the apparatus 10. The airline 36 to the nozzle 24 is activated to provide the longitudinal air stream 71 down one side of the chute 20. The first chopper 40 is activated to take up the binder strand 48 and cut it to the desired lengths. The desired length of cut is determined by the need to separate the binder fiber 48 completely into individual filaments and how the particular binder fiber being used is held together. For example, if the binder filaments 76 are formed into a strand by turning or crimping the filaments three times per inch, the chopper 40 will be set to cut the strand at one-third inch intervals. This length of cut ensures that no cut length 74 of binder fiber will have its filaments 76 held together by more than one turn or crimp. Thus, the binder filaments within each cut length 74 can be easily separated. Alternatively, untangled or loosely held strands of filaments may be cut to any desired length.

The first chopper 40, after cutting the binder fiber strand 48 into cut lengths 74, entrains the cut lengths 74, by means of an airstream 84, transversely into chute 20 through side opening 28 and thereby into the longitudinal airstream 71. It will be appreciated that either chopper 40, 42 may entrain its cut fibers 74, 78 into the chute 20 without additional thrust from a chopper supplied airstream 84, 86 if such an arrangement is adequate for the size of chute being used.

As the cut lengths 74 of binder fiber impinge upon the longitudinal airstream the filaments 76 therein are blown apart from each other. At this point approximately ninety-five percent of the filaments are separated out from the cut lengths 74.

The second chopper 42 is activated an instant after the first chopper 40 to entrain cut bundles 78 of glass fiber from the glass fiber roving 52 into the chute 20. The length of the glass bundles 78 is largely determined by the physical properties desired in the final product. The glass bundles 78 have more mass than the cut binder lengths 74 and therefore will travel through the longitudinal airstream and rebound off the chute wall 32.

As seen in FIG. 4, the glass bundles 78 will substantially retain their original physical form and will not be separated into individual filaments 80 by the longitudinal airstream or by contact with the chute wall 32. Mixing of the binder filaments 76 and the glass bundles 78 occurs in the glass-bundle rebound area 82 of the chute. Impingement of the glass bundles 78 on the binder filaments 76 will substantially complete the remaining five percent of binder filament 76 separation. In that case where the composite part is to be subsequently liquid cast, i.e., impregnated with a liquid resin for final molding, the mixture of fibers 72 is approximately ninety-five percent structural to five percent binder. In such case, the resin binder fibers are in an amount sufficient to hold the composite material together until final liquid casting A higher percentage of binder fibers will be used in the case where these fibers are to provide the final product binding matrix. In the latter case the structural fibers may be as low as seventy percent and the binder fibers as high as thirty percent of the composite mixture.

Finally, the fiber mixture 72 is directed out of the chute second end 26 onto the foraminous mold or surface 16. The resultant composite fiber material will contain individual binder filaments 76 substantially surrounding and contacting the glass bundles 78 in an evenly distributed three dimensional matrix of randomly oriented fibers.

Upon heating, the binder filaments 76 will adhere to the glass bundles 78 and to each other thereby knitting together the entire structure and producing a composite material capable of further processing into a finished part. It will be appreciated that this dry matrix of fibers 72 will require substantially less heat to set than the known preforms using an aqueous binder. Thus, a savings in time and energy costs is obtained.

As seen in FIG. 2, should the width of the mold require more than one fiber delivery device 14 for necessary fiber coverage, a plurality of fiber delivery devices 14 may easily be arranged over the mold 16 in a variety of arrays.

As graphically illustrated in FIGS. 5a and 5b, without any baffling, the natural distribution of the fibers from the chute 20 onto the mold 16 is heavily center-weighted under the diameter of the chute. In other words, the amount of fiber deposited at, or beyond, the edges of the chute 20 drops off rapidly, as represented by the steep bell curves 90.

In order to alleviate the undesired areas of sparse fiber deposition on those parts of a mold which may lie beneath or beyond the edges of the chute 20, a mechanical baffle 56 of an oblique airstream 88, or both, may be utilized as means for fanning the standard fiber distribution and thereby substantially evenly spreading the fiber mixture 72 over the mold 16. Alternatively, the enclosed chute cylindrical portion 30 may be shaped to provide the necessary mechanical baffling.

In use of the illustrated embodiment the stream of fibers emitted from the chute is compressed on each of two opposing sides by the mechanical baffle 56, and the oblique airstream 88 from the additional nozzle 58, respectively, to broaden the stream, thereby changing the distribution pattern from a circle to an eclipse as graphically represented by the flattened curves 92.

Care must be taken in the placement and operation of the additional fan elements 56, 58 so as to not separate or stratify the heavy glass bundles 78 and light individual binder filaments 76 from their well-mixed condition in the longitudinal airstream 71.

Thus it will be seen that the present invention provides a clean and efficient method of delivering fibers to a foraminous mold in a well distributed matrix of individual binder filaments and glass fiber bundles.

Having, thus, described the invention, what is claimed is:

1. An apparatus for the delivery of fibers to a foraminous mold, comprising:
   (a) a support rack:
   (b) a substantially tubular chute which is adjustably attached to the support rack, the chute having:
      (1) an upper end having an opening for receiving an airstream,
      (2) a lower end having an opening for discharging preform fibers, and,
      (3) an opening in the chute for admitting preform fibers into the chute;
   (c) means for attaching a structural fiber chopper in proximity to the chute;
   (d) an air nozzle attached to the chute proximate the upper end for directing an airstream through the chute in a direction from the upper end to the lower end.

2. The apparatus of claim 1, further comprising: a binder fiber chopper capable of receiving and being located in proximity to the chute.

3. The apparatus of claim 2, further comprising:
   a structural fiber chopper capable of receiving and cutting a strand of structural fiber, the structural fiber chopper being located in proximity to the chute.

4. The apparatus of claim 2, further comprising:
   means for entraining binder fibers into the chute.

5. The apparatus of claim 2, further comprising:
   means for entraining structural fibers into the chute.

6. The apparatus of claim 1, further comprising means for fanning a fiber distributio from the chute.

7. The apparatus of claim 6 wherein the fanning means comprises a second nozzle for dispersing an airstream obliquely to the longitudinal axis of the chute, the second nozzle located in proximity to the chute.

8. The apparatus of claim 6, wherein the fanning means comprises a mechanical baffle.

9. A method for applying fibers to a foraminous mold in a method of manufacturing preforms, comprising the steps of:
   (a) placing a chute over a foraminous mold;
   (b) producing an airstream within the chute directed towards the foraminous mold;
   (c) entraining chopped binder fibers into the airstream; separating the binder fibers with the airstream into individual binder filaments;
   (d) entraining cut lengths of structural fibers into the airstream at a point in the chute downstream of the point where the binder fibers are entrained to create a dispersal pattern; and,
   (e) directing the dispersal pattern of binder filaments and structural fibers onto a foraminous mold.

10. The method of claim 9 further comprising the steps of producing the binder fibers by cutting a strand of binder fibers before the entrainment of the binder fibers into the airstream.

11. The method of claim 9 further comprising the steps of producing the structural fibers by cutting a strand of structural fiber before the entrainment of the structural fiber into the airstream.

12. The method of claim 9, further comprising the step of,
   fanning the dispersal pattern of the mixture of binder filaments and structural fibers before the mixture reaches the foraminous mold.

13. A method of manufacturing a preform, comprising the steps of:

(a) chopping sections off of a strand of structural fiber with a structural fiber chopper;
(b) chopping sections off of a strand of binder fiber which comprises a plurality of individual binder fiber filaments with a binder chopper which is different from the structural fiber chopper;
(c) at least partially separating the chopped binder fiber sections into individual binder fiber filaments;
(d) intermingling the binder fiber sections with the structural fiber sections within a hollow chute to form a fiber mixture;
(e) applying the fiber mixture in a dispersal pattern onto a foraminous mold; and
(f) adhering the fiber mixture together to form a preform.

14. The method of claim 13, wherein the binder fiber is dry when applied to the mold.

15. The method of claim 13, wherein the binder fiber comprises polyester.

16. The method of claim 13, further comprising a step of modifying the dispersal pattern of the fibers before the fiber mixture reaches the mold.

17. A method of manufacturing a preform, comprising the steps of:
(a) chopping sections off of a strand of structural fiber with a structural fiber chopper and moving the chopped sections through a hollow chute toward and onto a foraminous mold, the chute having two open ends;
(b) chopping sections off of a strand of binder fiber with a binder fiber chopper which is different from the structural fiber chopper, said binder fiber being made of a plurality of binder fiber filaments;
(c) at least partially separating the chopped binder fiber sections into binder fiber filaments, and moving the chopped binder fiber through the chute towards and onto the mold, the chopped binder fiber intermingling with the chopped structural fiber to define a dispersal pattern; and
(d) adhering the chopped fibers together to form a preform.

18. The apparatus of claim 1, further comprising at least one additional chute attached to the support rack which is substantially identical to the first chute.

19. An apparatus for the delivery of fibers to a foraminous surface, comprising:
(a) a support rack;
(b) a substantially tubular chute having:
(1) an open upper end, and
(2) an open lower end;
(c) a device for creating an airstream flowing from the upper end through the lower end of said chute;
(d) means for adjusting the vertical distance between said chute and said mold;
(e) a first mechanism for introducing chopped binder fibers into the chute airstream; and
(f) a second mechanism for introducing structural fibers into the chute airstream whereby a mixture of said binder and structural fibers is discharged from the lower chute opening.

20. An apparatus as set forth in claim 19 wherein said second mechanism is positioned to introduce the structural fibers into the chute airstream below the introduction of the binder fibers.

21. An apparatus as set forth in claim 19 wherein the airstream device is disposed proximate the upper end of said chute.

22. An apparatus as set forth in claim 19 wherein the first and second mechanisms are disposed to introduce the respective fibers from the same side of said chute.

23. An apparatus as set forth in claim 22 wherein the airstream device is disposed proximate the upper end of and offset to one side of said chute generally opposite the side where the fibers are introduced whereby the airstream is concentrated along said opposite side.

24. A method of manufacturing a composite fibrous material comprising the steps of:
(a) chopping sections off of a strand of structural fiber;
(b) chopping sections off of a strand of binder fiber which comprises a plurality of individual binder fiber filaments and which binder shopping is done independently of the structural fiber chopping;
(c) at least partially separating the chopped binder fiber sections into individual binder fiber filaments;
(d) intermingling the binder fiber sections with the structural fiber sections to form a fiber mixture;
(e) applying the fiber mixture in a dispersal pattern onto a foraminous surface; and
(f) adhering the fiber mixture together to form the composite material.

* * * * *

UNITED STATES PATENT AND TRADEMARK OFFICE
CERTIFICATE OF CORRECTION

PATENT NO. :   5,229,052

DATED     :   July 20, 1993

INVENTOR(S) :   Charles R. BILLIU

It is certified that error appears in the above-identified patent and that said Letters Patent is hereby corrected as shown below:

Column  8, line 31; replace "distributio" with
---distribution---.

Signed and Sealed this

Twelfth Day of April, 1994

Attest:

BRUCE LEHMAN

Attesting Officer

Commissioner of Patents and Trademarks